Figure 1:
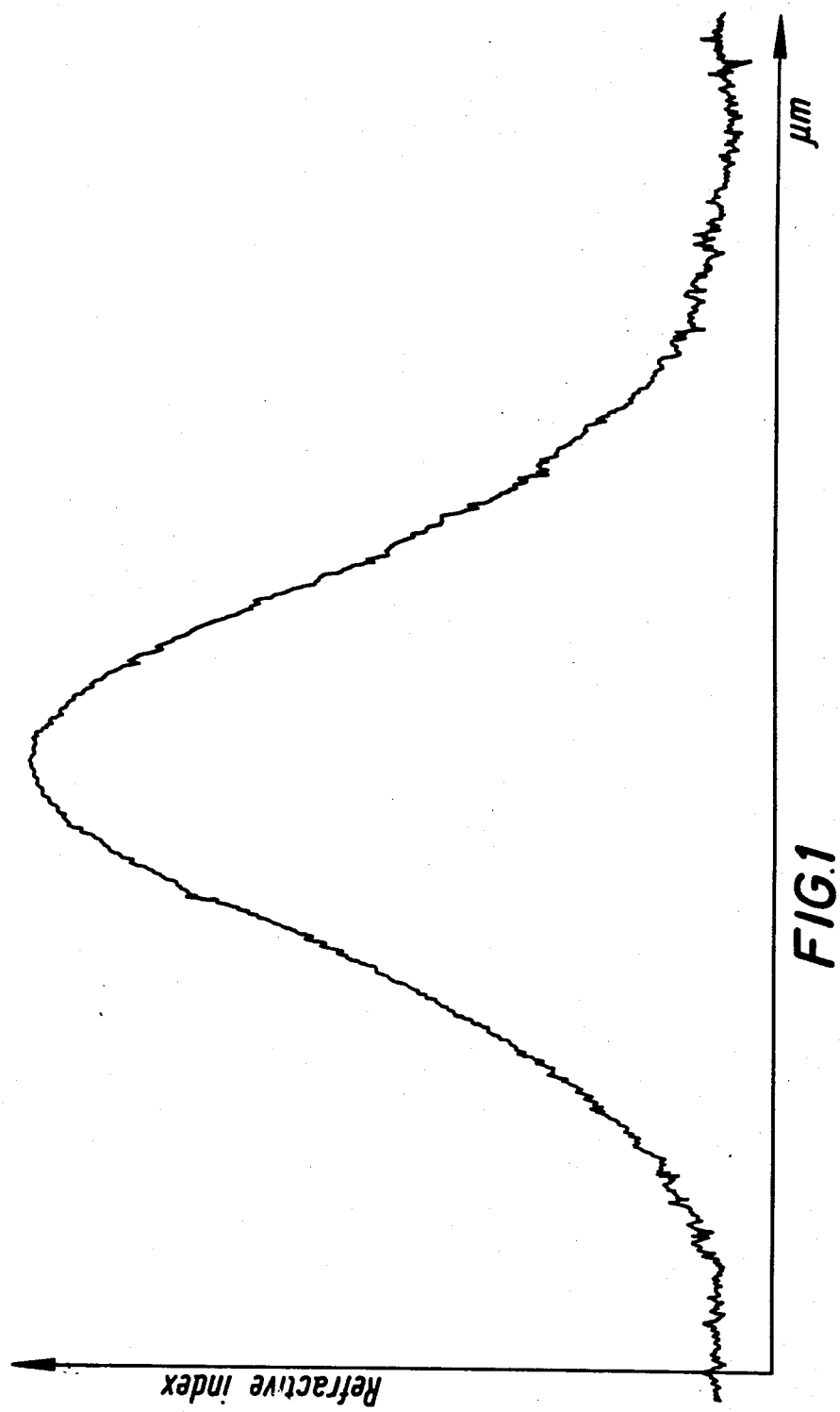

United States Patent [19]

Beales et al.

[11] 4,452,508

[45] * Jun. 5, 1984

[54] GRADED INDEX OPTICAL FIBRES

[75] Inventors: Keith J. Beales; William J. Duncan, both of Ipswich; Anthony G. Dunn, Woodbridge; George R. Newns, Hintlesham, all of England

[73] Assignee: British Telecommunications, London, England

[*] Notice: The portion of the term of this patent subsequent to Jun. 30, 1998 has been disclaimed.

[21] Appl. No.: 522,527

[22] Filed: Aug. 12, 1983

Related U.S. Application Data

[63] Continuation of Ser. No. 112,702, Jan. 16, 1980, abandoned, which is a continuation-in-part of Ser. No. 105,652, Dec. 20, 1979, Pat. No. 4,275,951, which is a continuation of Ser. No. 919,238, Jun. 26, 1978, abandoned.

[30] Foreign Application Priority Data

Jun. 28, 1977 [GB] United Kingdom ............... 26924/77
Apr. 19, 1979 [GB] United Kingdom ................ 7912650
Apr. 19, 1979 [GB] United Kingdom ................ 7912651

[51] Int. Cl.³ .................. C03C 3/08; C03C 13/00; G02B 5/14
[52] U.S. Cl. .................. 350/96.31; 65/3.13; 350/96.34; 501/37; 501/65; 501/66
[58] Field of Search .............. 501/37, 65, 66; 350/96.31, 96.34, 96.3, 96.29; 65/3.13, 3.14, 3.11

[56] References Cited

U.S. PATENT DOCUMENTS 4,242,117 12/1980 van Ass ..................... 350/96.31
4,264,131 4/1981 Sawamura et al. ........... 350/96.34
4,275,951 6/1981 Beales et al. ................ 350/96.31
4,351,659 9/1982 Beales et al. ................ 65/3.13
4,367,012 1/1983 Ikeda et al. ................ 350/96.34

FOREIGN PATENT DOCUMENTS 2016443 9/1979 United Kingdom.

OTHER PUBLICATIONS

Wright, J. V. "Bandwidths of Diffused Core Fibres", 4th European Conf.—Optical Communications, Geneva (1978) pp. 270–275.

Newns, G. R. "Compound Glasses for Optical Fibres", 2nd European Conf.-Optical Communications, Paris (1976) pp. 22–26.

*Primary Examiner*—Helen M. McCarthy
*Attorney, Agent, or Firm*—Kemon & Estabrook

[57] ABSTRACT

A range of alkali metal borosilicate glass compositions modified by the addition of alkaline earth metal oxides has been found to be especially suitable for the production of graded index optical fibre using the double crucible method. A core glass from this range may be paired with a suitable cladding glass, which may be another glass from the same range or an unmodified alkali metal borosilicate, so that in the nozzle of the double crucible thermal diffusion takes place to give a composition gradient of alkaline earth metal oxide and hence a refractive index gradient. The fibres thus obtained have better refractive index profiles if the proportions of the oxides in the core and cladding glasses are chosen so as to exclude a simple ion-exchange mechanism. Fibres having numerical apertures of up to 0.268 and best loss values as low as 5.0 dB/km have been prepared.

10 Claims, 12 Drawing Figures

GRADED INDEX OPTICAL FIBRES

This application is a continuation of Ser. No. 112,702, filed Jan. 16, 1980, now abandoned, which in turn is a continuation-in-part of Application Ser. No. 105,652, filed Dec. 20, 1979, now U.S. Pat. No. 4,275,951 dated June 30, 1981, which in turn is a continuation of Ser. No. 919,238, filed June 26, 1978, now abandoned.

The present invention relates to graded index optical fibres and their production by thermal diffusion using the double crucible drawing technique.

In order to produce optical fibres suitable for use in telecommunications systems it is necessary to ensure that the loss in the optical fibres is 20 dB/km or less. This requirement imposes stringent conditions on the quality of the glasses from which the fibres are made. For example, it is important that such glasses should have a low concentration of transition metal ions and water, which give rise to absorption hands. It is also important that phase separation and devitrification should not occur in the glasses when the fibre is drawn, because even if present to only a slight extent these effects will result in glasses with a high scatter loss.

Up to the present time greatest success has been encountered with pure and doped vitreous silicas. It is possible to produce vitreous silica in an extremely pure state, so that absorption losses due to impurities are as low as 2 dB/km. In order to produce a second glass, with a refractive index different from that of pure silica, small quantities of dopants, for example, titanium dioxide, are added. In this way optical fibers can be made with a doped silica core and a pure silica cladding. Such optical fibres have an extremely low loss. Because, however, of the higher softening point of vitreous silica, there are difficulties in the preparation of optical fibres from these materials. For example, the usual technique used in the fabrication of dielectric optical waveguides is to prepare a preform consisting of a clad rod and then to draw this down to a suitable diameter to form the dielectric optical waveguide.

From the point of view of convenience of manufacture the double crucible technique for drawing fibres is ideal. This technique involves melting two glasses, one in a first crucible and the other in a second crucible, the first crucible being located within the second crucible. Both crucibles have drawing nozzles. The fibre thus formed is a clad fibre which is capable of acting as a dielectric optical waveguide. Ideally low melting point glasses are required for the double crucible technique. Such glasses are however complex, containing as a rule at least three oxides, and this introduces problems in keeping the glass losses at a sufficiently low level to permit the production of satisfactory optical fibres. U.S. Pat. No. 3,957,342 describes and claims a family of sodium borosilicate glasses of low softening point and low absorption and scatter loss which have proved highly satisfactory for the production of stepped index optical fibres.

The double crucible drawing technique is especially well adapted for the production of graded index fibre by thermal diffusion: see, for example U.S. Pat. No. 4,040,807 and Proceedings of the Second European Conference on Optical Fibre Communications, Paris, September 1976, pages 21-26. In this process, the core and clad glasses are subjected to a heat treatment which permits interdiffusion of the mobile oxides in the two glasses, this heat treatment being carried out during the drawing operation by controlling the length of the drawing nozzle in the double crucible. Using the glasses described and claimed in U.S. Pat. No. 3,957,342, graded index fibre suitable for a wide range of applications can be produced by this process, but the quality is not of the very highest.

The present invention is concerned with graded index optical fibres produced from alkali metal borosilicate glasses similar to those defined in U.S. Pat. No. 3,957,342, but modified by the addition of alkaline earth metal oxides. These glasses show considerable potential for the production of high quality graded index fibre by the double crucible method. It is believed that the oxide responsible for the gradation of refractive index is the alkaline earth metal oxide.

Previously it had been thought that calcium oxide, for example, was not able to diffuse readily at fibre-drawing temperatures. We have, however, demonstrated that this is incorrect, and that calcium oxide and other alkaline earth metal oxides can be used in thermal diffusion techniques for the production of graded index fibre. This represents a major advance in the state of the art with regard to the production of graded index fibre using the double crucible technique.

Despite the fact that calcium oxide would appear to be an unlikely material to use because it was believed to have a low diffusion coefficient, it was decided to try this material because there was a little ultra-pure calcium carbonate available in the laboratory at a time when no other ultra-pure materials apart from boric oxide, silica and sodium carbonate were available. Much to our surprise we discovered that, contrary to previously held beliefs, calcium oxide was capable of diffusing at the drawing temperature of the optical fibres with a diffusion coefficient of from $10^{-8}$ to $10^{-7} cm^2 sec^{-1}$, only very slightly slower than that of sodium oxide. The explanation for this discovery would appear to be that previous measurements of diffusion coefficient for calcium oxide were made at or below the glass transition temperature where the diffusion coefficient of calcium oxide is at least 100 times lower than that for sodium oxide. Calcium oxide has, however, a high activation energy for diffusion. This means that the diffusion coefficient increases with temperature much more rapidly for calcium oxide than for sodium oxide, hence the high diffusion coefficient for calcium oxide at the fibre drawing temperature. Similar considerations apply to other alkaline earth metal oxides, for example barium oxide.

According to a first aspect of the present invention there is provided a graded index glass optical fibre having a total insertion loss of less than 20 dB/km and having a core and a cladding, said core being formed from a first glass consisting of:
(a) silica,
(b) boric oxide,
(c) one or more alkali metal oxides selected from the group consisting of sodium oxide and potassium oxide, and
(d) one or more alkaline earth metal oxides selected from the group consisting of calcium oxide, strontium oxide and barium oxide and optionally,
(e) up to about 5 mole percent of one or more other compatible oxides.
and said cladding being formed from a second glass having a refractive index at least 1% lower than that of said first glass and consisting of:
(f) silica, (g) boric oxide,
(h) one or more alkali metal oxides selected from the group consisting of sodium oxide and potassium oxide, and, optionally,
(i) one or more alkaline earth metal oxides selected from calcium oxide, strontium oxide, barium oxide and magnesium oxide, and, also optionally,
(j) up to about 5 mole percent of one or more other compatible oxides,
said first and second glass compositions being selected to exclude compositions which undergo phase separation or devitrification during optical fibre production, and said gradation of refractive index being produced by thermal diffusion between said first and second glasses and being at least partly caused by a composition gradient of alkaline earth metal oxide.

In these glasses, the upper limit for silica has been set at about 70 mole percent because above this limit difficulties in homogenisation and in melting in silica crucibles are encountered. The lower limit for silica has been set at about 50 mole percent because of poor glass durability below this value. When sodium oxide is used, the lower limit for this component has been set at 13 mole percent because of problems due to phase separation of the glass below this limit and the upper limit has been set at 33 mole percent because of lack of data on glasses with higher soda content.

Potassium oxide may if desired be used instead of sodium oxide. The potash-boro-silicate glass system is in many ways similar to the soda-boro-silicate system except that the region of stable glass formation is smaller. If, for example, sodium oxide is used in the core glass and potassium oxide in the clad glass, sodium-potassium exchange can occur in the double crucible in addition to alkaline earth metal oxide diffusion. The provision of several diffusing species enables a better approach to the optimum refractive index profile to be produced.

The overall percentage of alkaline earth metal oxide should not exceed 20 mole percent.

The choice of alkaline earth metal oxide for the core glass and, if present, for the cladding glass, and the amount in which it is used, is primarily determined by the need to observe the correct refractive index relationship: the refractive index of the core glass should be at least 1% higher than that of the cladding glass. Calcium oxide, strontium oxide and barium oxide all raise the refractive index of sodium borosilicate glass, the effect increasing in the order stated, whereas magnesium oxide lowers it slightly. Glasses containing any of the three first-mentioned oxides can also be used as core glasses in combination with unmodified alkali metal borosilicate cladding glasses or with alkali metal borosilicates modified by a smaller amount of the same oxide. Some possible combinations are listed as follows:

| | |
|---|---|
| CaO | MgO |
| SrO | MgO |
| BaO | MgO |
| CaO | — |
| SrO | — |
| BaO | — |
| CaO | CaO (smaller amount) |
| SrO | SrO (smaller amount) |
| BaO | BaO (smaller amount) |
| SrO | CaO |
| BaO | CaO |
| BaO | SrO |

It may be seen that a core glass may contain calcium, strontium or barium oxide and may be paired (a) with a sodium borosilicate cladding glass containing no alkaline earth metal oxide, (b) with a cladding glass containing an appropriately smaller quantity of the same alkaline earth metal oxide, or (c) with an appropriately selected alkaline earth metal oxide different from that contained in the core glass.

In these glasses, the silica and boric oxide are network formers and the alkali metal and alkaline earth metal oxides are network modifiers, and the diffusion taking place in the double crucible may involve ion-exchange between the metal ions of the network-modifier oxides. Whether or not such ion-exchange can take place depends on the proportions of the various oxides in the core and cladding glasses.

Consider the case where the core and cladding glasses contain identical proportions of silica, boric oxide and sodium oxide, and the core glass contains 10 mole percent of barium oxide and the cladding glass contains 10 mole percent of calcium oxide. Here the diffusion process involves exchange of ions of like charge, $Ba^{2+}/Ca^{2+}$. If the cladding glass contained potassium oxide instead of sodium oxide, the much faster $Na^+/K^+$ exchange would also occur.

In a case where only the core glass contains an alkaline earth metal oxide, however, this type of exchange involving divalent ions is not possible because of the lack of available divalent ions from the cladding glass. If, for example, the core glass contains 15 mole percent of sodium oxide 7.5 mole percent of calcium oxide while the cladding glass contains 22.5 mole percent of sodium oxide, the $Ca^{2+}$ ions exchange with ions of unlike charge type, i.e., the $Na^+$ ions from the cladding glass.

Further investigations have now demonstrated to us that, most unexpectedly, significantly better refractive index profiles are obtained from fibres in which the components of the core and cladding glasses and their proportions are so chosen that no simple ion-exchange mechanism of this type can be postulated, i.e. where alkaline earth metal ions in the core glass are apparently diffusing against the network formers of the cladding glass. Outstandingly good results have been obtained by matching a sodium borosilicate core glass containing barium oxide with a sodium borosilicate cladding glass, the proportions being chosen to exclude $Ba^{2+}/Na^+$ exchange.

The particular improvement that results from using such a glass pair to make an optical fibre by the couble crucible process is that refractive index profile shows substantially reduced "tail" areas as compared with the profiles of glass pairs in which diffusion can be explained by a simple ion-exchange mechanism. The profile approximates better to the ideal parabolic distribution and hence gives a significantly better bandwidth.

We have demonstrated this improvement both by calculating theoretical bandwidths from measured refractive index profiles and by independent measurement of the actual bandwidths. These results will be discussed in more detail below.

According to a second aspect of the present invention there is accordingly provided a graded index optical fibre as previously defined, said first glass consisting of
(a) silica,
(b) boric oxide,
(c) sodium oxide or potassium oxide, (d) an alkaline earth metal oxide selected from the group consisting of calcium oxide, strontium oxide and barium oxide, and, optionally, (e) up to about 5 mole percent of one or more other compatible oxides, and said second glass consisting of (f) silica, (g) boric oxide, (h) sodium oxide or potassium oxide, and optionally, (i) an alkaline earth metal oxide identical to component (d) of said first glass, in a molar proportion sufficiently less than the molar proportion of said component (d) in said first glass that the refractive index of said second glass is at least 1% lower than the refractive index of said first glass, and, also optionally, (j) up to about 5 mole percent of one or more other compatible oxides, the proportions of said components (c), (d), (h) and, if present (i), being chosen so as to exclude ion-exchange between alkaline earth metal ions and alkali metal ions during said thermal diffusion.

Component (c) of the core glass and component (h) of cladding glass are both preferably sodium oxide, i.e. the core glass is preferably a modified sodium borosilicate and the cladding a modified or unmodified sodium borosilicate.

The composition of the cladding glass must, as previously mentioned, be matched to that of the core glass as far as the proportions of alkali metal oxide and alkaline earth metal oxide are concerned, so that there are no available alkali metal ions or alkaline earth metals in the cladding glass to set up an ion-exchange mechanism with those in the core glass. Thus the proportion of alkali metal oxide in the cladding glass must be less than or equal to, preferably equal to, the proportion of alkali metal oxide in the core glass, and the same alkali metal oxide is preferably used in both glasses. Similarly, the proportion of alkaline earth metal oxide in the cladding glass must be less, preferably considerably less, than its proportion in the core glass; most preferably the cladding glass contains no alkaline earth metal oxide at all.

Preferred proportions of the components in the core glass are as follows, the percentages being based on the total of components (a), (b), (c) and (d):

| (a) SiO$_2$ | 55 to 65 mole percent |
|---|---|
| (b) B$_2$O$_3$ | 10 to 20 mole percent |
| (c) Na$_2$O | 14 to 25 mole percent |
| (d) BaO, SrO or CaO | 2 to 11 mole percent |

Barium oxide has a larger effect on the refractive index than does calcium oxide, as previously mentioned, and can therefore be used in a smaller quantity. If calcium oxide is used, an especially suitable quantity is from 7 to 11 mole percent.

The use of barium oxide gives a more diffused profile; in spite of the larger ionic radius of Ba$^{2+}$ (1.34, as compared with 0.99 for Ca$^{2+}$) it has a higher diffusion coefficient. The use of barium oxide is also preferred because calcium-oxide-containing glass is more difficult to make; the calcium oxide glasses corrode a silica glass making crucible more rapidly than do the barium oxide glasses, this effect being intensified by the fact that a larger quantity of calcium oxide is required. Barium oxide is advantageous used in a quantity of from 3 to 8 mole percent, especially from 3 to 5 mole percent.

Thus an especially favoured core glass composition for use according to the invention is as follows:

| (a) SiO$_2$ | 57 to 61 mole percent |
|---|---|
| (b) B$_2$O$_3$ | 14 to 16.5 mole percent |
| (c) Na$_2$O | 19 to 22 mole percent |
| (d) BaO | 3 to 8 mole percent |

Preferred proportions of the components of the cladding glass are as follows, the percentages being based on the total of components (f), (g) and (h):

| (f) SiO$_2$ | 55 to 65 mole percent |
|---|---|
| (g) B$_2$O$_3$ | 10 to 20 mole percent |
| (h) Na$_2$O | 14 to 25 mole percent |
| no component (i), | | and especially favourable proportions are as follows:

| (f) SiO$_2$ | 59 to 63 mole percent |
|---|---|
| (g) B$_2$O$_3$ | 17 to 19 mole percent |
| (h) Na$_2$O | 19 to 22 mole percent |
| no component (i). | |

Thus according to a third aspect of the present invention there is provided a graded index optical fibre as previously defined, said first glass consisting of:

| (a) SiO$_2$ | 57 to 61 mole percent |
|---|---|
| (b) B$_2$O$_3$ | 14 to 16.5 mole percent |
| (c) Na$_2$O | 19 to 22 mole percent |
| (d) BaO | 3 to 8 mole percent |
| (e) (optional) up to about 5 mole percent of one or more other compatible oxides, and said second glass consisting of: | |
| (f) SiO$_2$ | 59 to 63 mole percent |
| (g) B$_2$O$_3$ | 17 to 19 mole percent |
| (h) Na$_2$O | a molar percentage less than or equal to that of Na$_2$O in the core glass, within the range of from 19 to 22 mole percent, no component (i), and |
| (j) (optional) up to about 5 mole percent of one or more other compatible oxides. | |

A further improvement in the refractive index profile may in some cases be obtained if component (j) of the cladding glass includes aluminium oxide, the core glass being substantially free of this oxide. Preferably the amount of alumina in the cladding glass does not exceed 4 mole percent, and the amount is advantageously within the range of from 2 to 3 mole percent.

The replacement of a small proportion of the silica in a sodium borosilicate cladding glass by alumina gives, with the same core glass, a reduction in the "tail" areas of the profile i.e. the $\phi$-value (extent of diffusion) at the sides of the profile is reduced, while the $\phi$-value at the centre of the profile is substantially unchanged. The "tailing" of a typical diffused-core fibre refractive index profile away from the fibre axis leads to degradation of the bandwidth by undercompensation of the high-angle rays that travel within that region. Reduction of the "tail" areas to give a more nearly parabolic profile will lead to an improvement in bandwidth, provided that the overall extent of diffusion is sufficiently high.

The addition of alumina also increases the durability of the glass.

When alumina is used, preferred proportions of the various oxides are as follows:

| First glass (core): | |
|---|---|
| (a) $SiO_2$ | 57 to 61 mole percent |
| (b) $B_2O_3$ | 14 to 16.5 mole percent |
| (c) $Na_2O$ | 19 to 22 mole percent |
| (d) BaO | 3 to 8 mole percent |
| (e) (optional) up to about 5 mole percent of other compatible oxides excluding $Al_2O_3$ | |
| Second glass (cladding): | |
| (f) $SiO_2$ | 57 to 62 mole percent |
| (g) $B_2O_3$ | 14 to 18 mole percent |
| (h) $Na_2O$ | 19 to 26 mole percent |
| (no component (i)) | |
| (j) $Al_2O_3$ | 2 to 3 mole percent and (optionally) one or more other compatible oxides, the total percentage of component (j) not exceeding 5 mole percent. |

The alumina behaves as a network former in these glasses and there is no participation of $Al^{3+}$ ions in ion-exchange processes.

As previously mentioned, other oxides may be added to the core and cladding glasses, up to a total of about 5 mole percent, the only limitation on these additives being that they should not cause substantial worsening of the optical properties, for example, absorption loss of the glass. For example, arsenic trioxide may be added, as described in U.S. Pat. No. 3,957,342 to stabilise the redox state of the glass.

The invention is illustrated by the following Examples. The batch materials used for the preparation of the various glasses were commercially available materials.

The boric oxide, sodium carbonate, alumina and silica used, except in Examples 5 to 10, typically contained from 10 to 20 parts in $10^9$ by weight of iron, less than 1 part in $10^9$ by weight of copper, less than b 1 part in $10^9$ by weight of chromium and less than 1 part in $10^9$ of other transition elements. The ultra-pure calcium carbonate and barium carbonate used contained less than 1 part by weight of $10^9$ of manganese, less than 1 part by weight of $10^9$ of iron, less than 1 part by weight in $10^9$ of copper, less than 1 part by weight in $10^9$ nickel, less than 1 part by weight in $10^9$ chromium and less than 1 part by weight in $10^9$ cobalt.

Slightly less pure starting materials were used in Examples 5 to 8. The boric oxide, sodium carbonate, potassium carbonate, alumina and silica used in these Examples typically contained from 0.05 to 0.2 ppm by weight of iron, 0.01 to 0.04 ppm by weight of copper, less than 0.05 ppm by weight of chromium and less than 0.01 ppm of other transition elements. The ultra-pure calcium carbonate and barium carbonate used contained less than 100 parts by weight in $10^9$ of manganese, less than 20 parts by weight in $10^9$ of iron, less than 10 parts by weight in $10^9$ of copper, less than 10 parts by weight in $10^9$ of nickel, less than 30 parts by weight in $10^9$ of chromium and less than 5 parts by weight in $10^9$ of cobalt. Somewhat less pure materials were used in Examples 9 and 10.

The glasses were prepared, as described in U.S. Pat. No. 3,957,342, by melting the high purity batch materials in silica crucibles (melt sizes up to 2 kg). A mixture of carbon monoxide and carbon dioxide was bubbled through the glass in order simultaneously to optimise its redox state and to homogenise and dry it, (except in Examples 9 and 10).

Rods (up to 1.5 m long and 12 mm diameter) were pulled from the surface of the melt and stored in silica tubes until required. In Examples 1 to 4 and 11 to 15, fibres were drawn from a platinum double crucible with a 30 cm drawing nozzle. As described in more detail in British Patent Application No. 10016/78, which corresponds to UK Patent Application No. 2,016,443A, the double crucible comprised an outer body portion for holding molten cladding glass and an inner body portion, within the outer body portion, for holding molten core glass. The inner body portion was provided with an exit orifice leading into the outer body portion and means were provided for maintaining the body portion at an elevated temperature. The rods were fed into the double crucible, and fibre was drawn at rates of 1.0 to 1.5 km/hr. The outside diameter of the fibre was maintained at $125 \pm 1$ μm by on-line monitoring and a slow feedback loop. The crucible design ensured a core to cladding ratio of 50:125. Subsequent to drawing, the fibre was coated with a silicone resin.

The fibres of Examples 5 to 8 and 10 were drawn from a Johnson Mathey platinum double crucible with a 10 cm nozzle. A different crucible, designed for large-core step-index fibre, was used in Example 9. The core diameters of the fibres of Examples 5 to 10 were as follows:

| Example | Core diameter (μm) |
|---|---|
| 5 | 45 |
| 6 | 53 |
| 7 | 46 |
| 8 | 40 |
| 9 | 80 |
| 10 | 55 |

The compositions of the glasses used in the Examples are listed in Table 1, together with an indication of the ion-exchange processes occurring during diffusion in the nozzle of the double crucible.

Examples 12 to 15 show the effect of alumina in the cladding glass and each has been paired in the Table with the corresponding Example in which no alumina was used in the cladding.

TABLE

| Example | Diffusion Type | GLASS COMPOSITIONS | | | | | | | | | | | |
|---|---|---|---|---|---|---|---|---|---|---|---|---|---|
| | | Core (mole %) | | | | | | Cladding (mole %) | | | | | |
| | | $SiO_2$ | $B_2O_3$ | $Al_2O_3$ | $Na_2O$ | BaO | CaO | $SiO_2$ | $B_2O_3$ | $Al_2O_3$ | $Na_2O$ | $K_2O$ | CaO | MgO |
| 1 | $Ba^{2+}/—$ | 60.0 | 16.0 | — | 20.0 | 4.0 | — | | | | | | | |
| 2 | $Ba^{2+}/—$ | 57.5 | 14.5 | — | 20.0 | 8.0 | — | 62.5 | 17.5 | — | 20.0 | — | — | — |
| 3 | $Ca^{2+}/—$ | 57.6 | 14.4 | — | 20.0 | — | 8.0 | | | | | | | |
| 4 | $Ba^{2+}/—$ | 60.0 | 15.0 | — | 21.0 | 4.0 | — | | | | | | | |
| 5 | $Ca^{2+}/2Na^+$ / $Ca^{2+}/—$ | 54.7 | 15.0 | — | 22.3 | — | 8.0 | 60.0 | 15.0 | — | 25.0 | — | — | — |

TABLE 1-continued

| | | GLASS COMPOSITIONS | | | | | | | | | | | | |
|---|---|---|---|---|---|---|---|---|---|---|---|---|---|---|
| | Diffusion | Core (mole %) | | | | | | Cladding (mole %) | | | | | | |
| Example | Type | SiO$_2$ | B$_2$O$_3$ | Al$_2$O$_3$ | Na$_2$O | BaO | CaO | SiO$_2$ | B$_2$O$_3$ | Al$_2$O$_3$ | Na$_2$O | K$_2$O | CaO | MgO |
| 6 | Ca$^{+2}$/2Na / Ca$^{2+}$/— | | | | | | | 62.5 | 12.5 | — | 25.0 | — | — | — |
| 7 | Ca$^{2+}$/2Na$^+$ / Ca$^{2+}$/— | 57.2 | 17.5 | — | 17.3 | — | 8.0 | 62.5 | 17.5 | — | 20.0 | — | — | — |
| 8 | Ca$^{2+}$/2Na$^+$ | 60.0 | 17.5 | — | 15.0 | — | 7.5 | 60.0 | 17.5 | — | 22.5 | — | — | — |
| 9 | Ba$^{2+}$/Ca$^{2+}$ | 60.0 | 10.0 | — | 20.0 | 10.0 | — | 60.0 | 10.0 | — | 20.0 | — | 10.0 | — |
| 10 | Ba$^{2+}$/Ca$^{2+}$ (Na$^+$/K$^+$) | 57.82 | 7.23 | 3.62 | 19.27 | 12.04 | — | 57.82 | 7.23 | 3.62 | — | 19.27 | 12.04 | — |
| 11 | Ca$^{2+}$/Mg$^{2+}$ | 57.2 | 17.5 | — | 17.3 | — | 8.0 | 57.2 | 17.5 | — | 17.3 | — | — | 8.0 |
| 12 | Ba$^{2+}$/— | 60.0 | 15.0 | — | 21.0 | 4.0 | — | 60.0 | 17.5 | 2.5 | 20.0 | — | — | — |
| 4 | | | | | | | | 62.5 | 17.5 | — | 20.0 | — | — | — |
| 13 | Ca$^{2+}$/2Na$^+$ | 57.2 | 17.5 | — | 17.3 | — | 8.0 | 60.0 | 17.5 | — | 20.0 | — | — | — |
| 14 | Ca$^{2+}$/— | | | | | | | 62.5 | 17.5 | — | 20.0 | — | — | — |
| 15 | Ca$^{2+}$/2Na$^+$ | | | | | | | 57.5 | 15.0 | 2.5 | 25.0 | — | — | — |
| | Ca$^{2+}$/— | 57.6 | 14.4 | — | 20.0 | — | 8.0 | | | | | | | |
| 3 | Ca$^{2+}$/— | | | | | | | 62.5 | 17.5 | — | 20.0 | — | — | — |

TABLE 1A

| | | GLASS COMPOSITIONS | | | | | | | | | | | | |
|---|---|---|---|---|---|---|---|---|---|---|---|---|---|---|
| | Diffusion | Core (wt %) | | | | | | Cladding (wt %) | | | | | | |
| Example | Type | SiO$_2$ | B$_2$O$_3$ | Al$_2$O$_3$ | Na$_2$O | BaO | CaO | SiO$_2$ | B$_2$O$_3$ | Al$_2$O$_3$ | Na$_2$O | K$_2$O | CaO | MgO |
| 1 | Ba$^{2+}$/— | 54.9 | 16.9 | — | 18.9 | 9.3 | — | | | | | | | |
| 2 | Ba$^{2+}$/— | 49.8 | 14.6 | — | 17.9 | 17.7 | — | 60.4 | 19.6 | — | 20.0 | — | — | — |
| 3 | Ca$^{2+}$/— | 56.3 | 16.3 | — | 20.1 | — | 7.3 | | | | | | | |
| 4 | Ba$^{2+}$/— | 54.9 | 15.9 | — | 19.8 | 9.3 | — | | | | | | | |
| 5 | Ca$^{2+}$/2Na$^+$ / Ca$^{2+}$/— | 53.3 | 16.9 | — | 22.4 | — | 7.3 | 58.2 | 16.8 | — | 25.0 | — | — | — |
| 6 | Ca$^{2+}$/2N / Ca$^{2+}$/— | | | | | | | 60.8 | 14.1 | — | 25.1 | — | — | — |
| 7 | Ca$^{2+}$/Na$^+$ / Ca$^{2+}$/— | 55.6 | 19.7 | — | 17.4 | — | 7.3 | 60.4 | 19.6 | — | 20.0 | — | — | — |
| 8 | Ca$^{2+}$/2Na$^+$ | 58.4 | 19.7 | — | 15.1 | — | 6.8 | 58.0 | 19.6 | — | 22.4 | — | — | — |
| 9 | Ba$^{2+}$/Ca$^{2+}$ | 51.0 | 9.8 | — | 17.5 | 21.7 | — | 59.1 | 11.4 | — | 20.3 | — | 9.2 | — |
| 10 | Ba$^{2+}$/Ca$^{2+}$ (Na$^+$/K$^+$) | 47.0 | 6.8 | 5.0 | 16.2 | 25.0 | — | 50.8 | 7.4 | 5.4 | — | 26.5 | 9.9 | — |
| 11 | Ca$^{2+}$/Mg$^{2+}$ | 55.6 | 19.7 | — | 17.4 | — | 7.3 | 56.8 | 20.1 | — | 17.7 | — | — | 5.3 |
| 12 | Ba$^{2+}$/— | 54.9 | 15.9 | — | 19.8 | 9.3 | — | 57.1 | 19.3 | 4.0 | 19.6 | — | — | — |
| 4 | | | | | | | | 60.4 | 19.6 | — | 20 | — | — | — |
| 13 | Ca$^{2+}$/2Na$^+$ | 55.6 | 19.7 | — | 17.4 | — | 7.3 | 57.1 | 19.3 | 4.0 | 19.6 | — | — | — |
| 14 | Ca$^{2+}$/— | | | | | | | 60.4 | 19.6 | — | 20 | — | — | — |
| 15 | Ca$^{2+}$/2Na$^+$ | | | | | | | 54.8 | 16.6 | 4.0 | 24.6 | — | — | — |
| | Ca$^{2+}$/— | 56.3 | 16.3 | — | 20.2 | — | 7.3 | | | | | | | |
| 3 | Ca$^{2+}$/— | | | | | | | 60.4 | 19.6 | — | 20.0 | — | — | — |

In Examples 1, 2, 4 and 12, Ba$^{2+}$ ions from the core glass are diffusing against the network formers of the cladding glass; this is indicated for the sake of simplicity as "Ba$^{2+}$/—" to show that there are no available alkaline earth metal or alkali metal ions in the cladding glass for the barium ions of the core glass to diffuse against. The exact nature of the diffusing species from the cladding glass is not known. Example 3 illustrates the diffusion of calcium ions from the core glass against the network formers of the cladding glass.

In Examples 5, 6, 7, 13, 14 and 15, the molar percentages of sodium oxide in the core and cladding glasses are such that some sodium ions from the cladding glass are available for diffusion against the calcium ions of the core glass. The remaining calcium ions must be accounted for by diffusion against the network formers.

Examples 9, 10 and 11 exemplify glass pairs in which a simple exchange of ions of like charge type can take place. The proportions of corresponding components in core and cladding are identical.

Finally, Example 8 is a glass pair in which exchange between ions of unlike charge type takes place. The proportions of the network formers in the core glass and the cladding glass are the same, and the molar percentage of sodium oxide in the cladding glass is equal to the sum of the molar percentages of calcium oxide and sodium oxide in the core glass.

Some optical properties of the fibres of the Examples are shown in Table 2.

TABLE 2

OPTICAL PROPERTIES OF FIBRES

| EXAMPLE | TOTAL INSERTION LOSS AT 850–900 nm (dB/km) | PULSE BROADENING (ns/km) | 3dB OPTICAL BANDWIDTH (MHz km) measured | 3dB OPTICAL BANDWIDTH (MHz km) theoretical | NUMERICAL APERTURE | $\phi$ |
|---|---|---|---|---|---|---|
| 1 | 5.2 | — | ≧300 | 257 | 0.209 | ~0.06 |
| 2 | 8.5 | — | >400 | — | 0.268 | ~0.06 |
| 3 | 5.0 | — | 150–294 | 142 | 0.184 | 0.02–0.05 |
| 4 | 10.8 | — | 100 | — | 0.192 | ~0.09 |
| 5 | 8.2 | 2.8 | — | — | 0.180 | 0.20 |
| 6 | 6.5 | ~2 | — | — | 0.197 | 0.05 |
| 7 | 6.4 | — | 95–111 | (63) | — | 0.01 |
| 8 | 10.0 | — | — | 206 | 0.150 | 0.06 |
| 9 | — | — | — | — | 0.210 | 0.02 |
| 10 | — | — | — | 63 | 0.210 | 0.08 |
| 11 | 5.0 | 5.0 | 90–100 | — | 0.23 | ~0.1–0.2 |
| 12 | 10.6 | — | 150 | — | 0.197 | ~0.09 |
| 4 | 10.8 | — | 100 | — | 0.192 | ~0.09 |
| 13 | 6.9 | — | 35 | — | 0.216 | ~0.01 |
| 14 | 3.7 | — | 72–136 | 65,84 | 0.195 | ~0.01 |
| 15 | 5.6 | — | >132 | 113 | 0.216 | less than for Example 3 |
| 3 | 5.0 | — | 150–294 | 142 | 0.184 | 0.02–0.05 |

Figure 2:
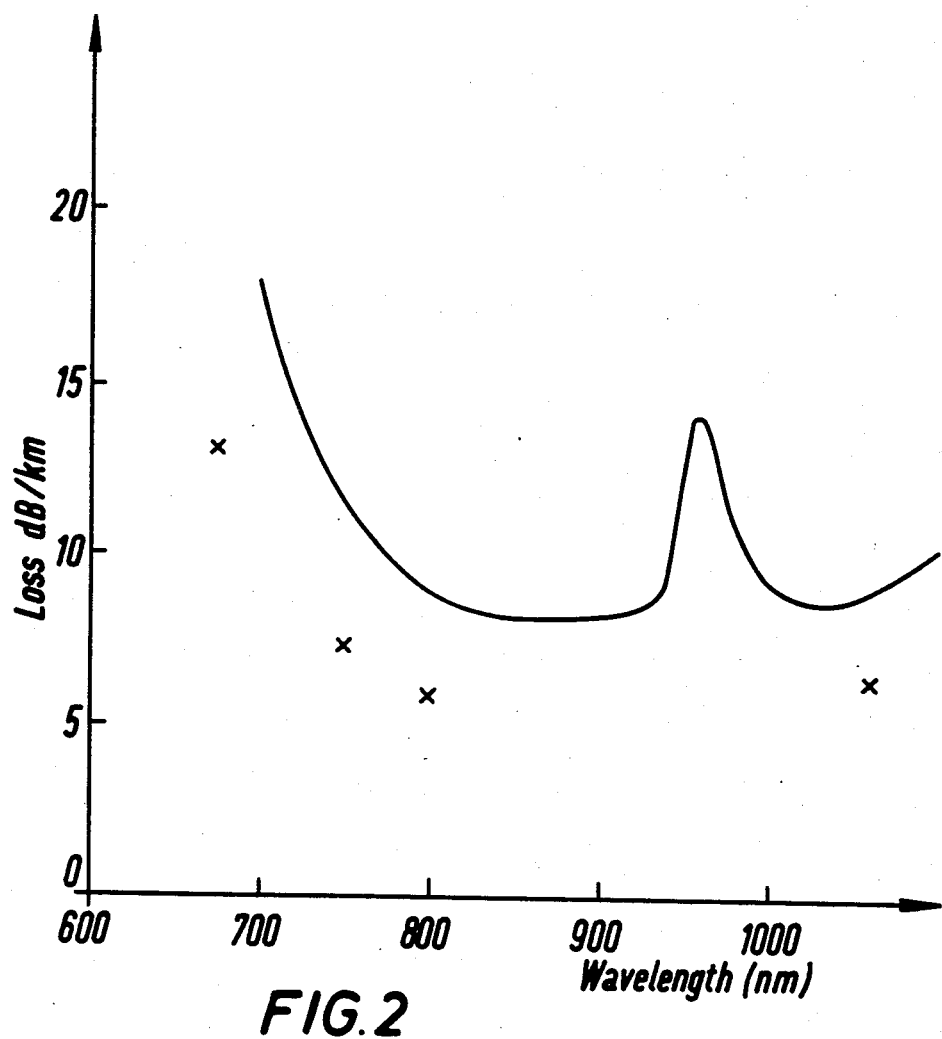
Figure 3:
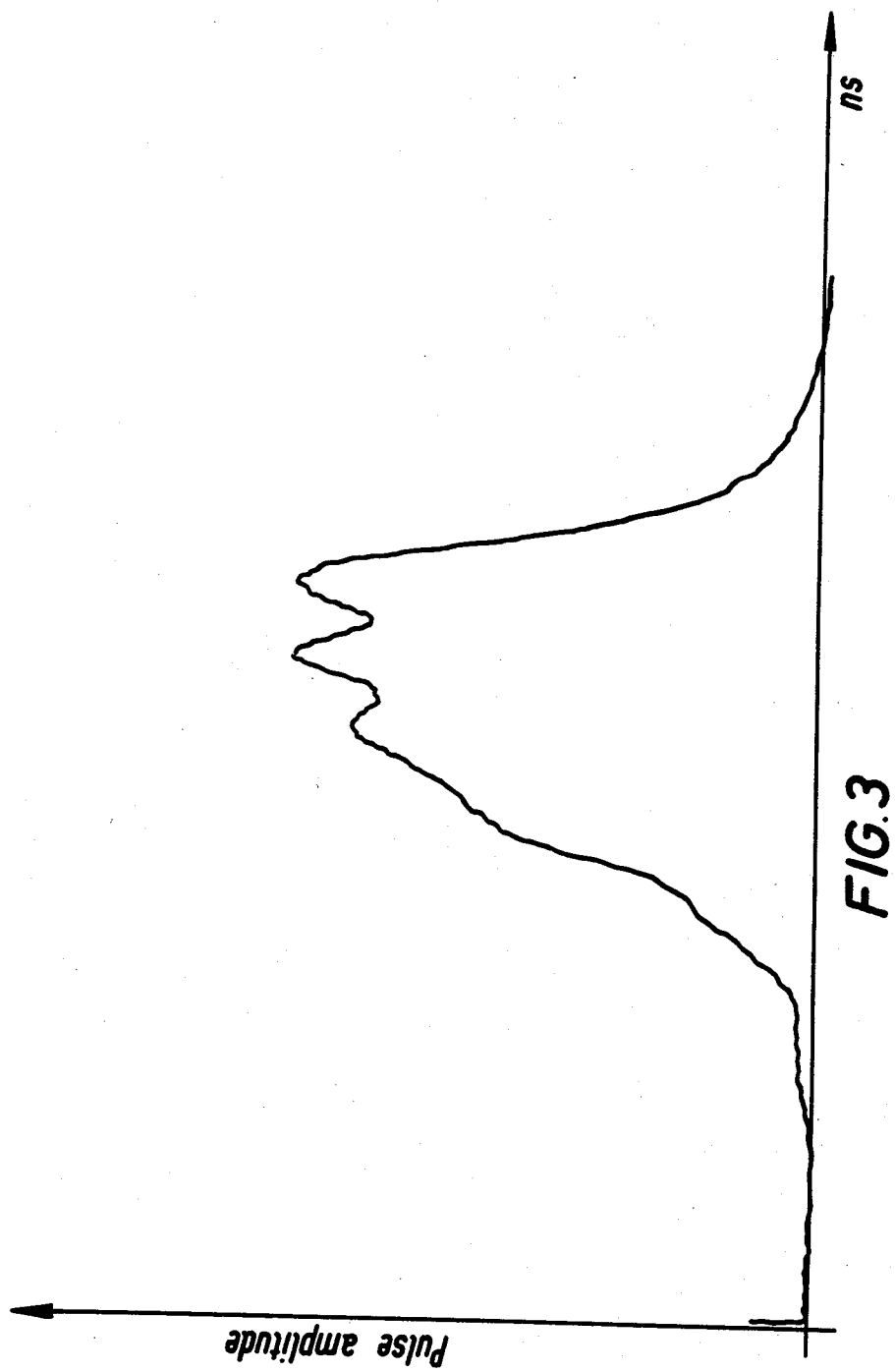
Figure 4:
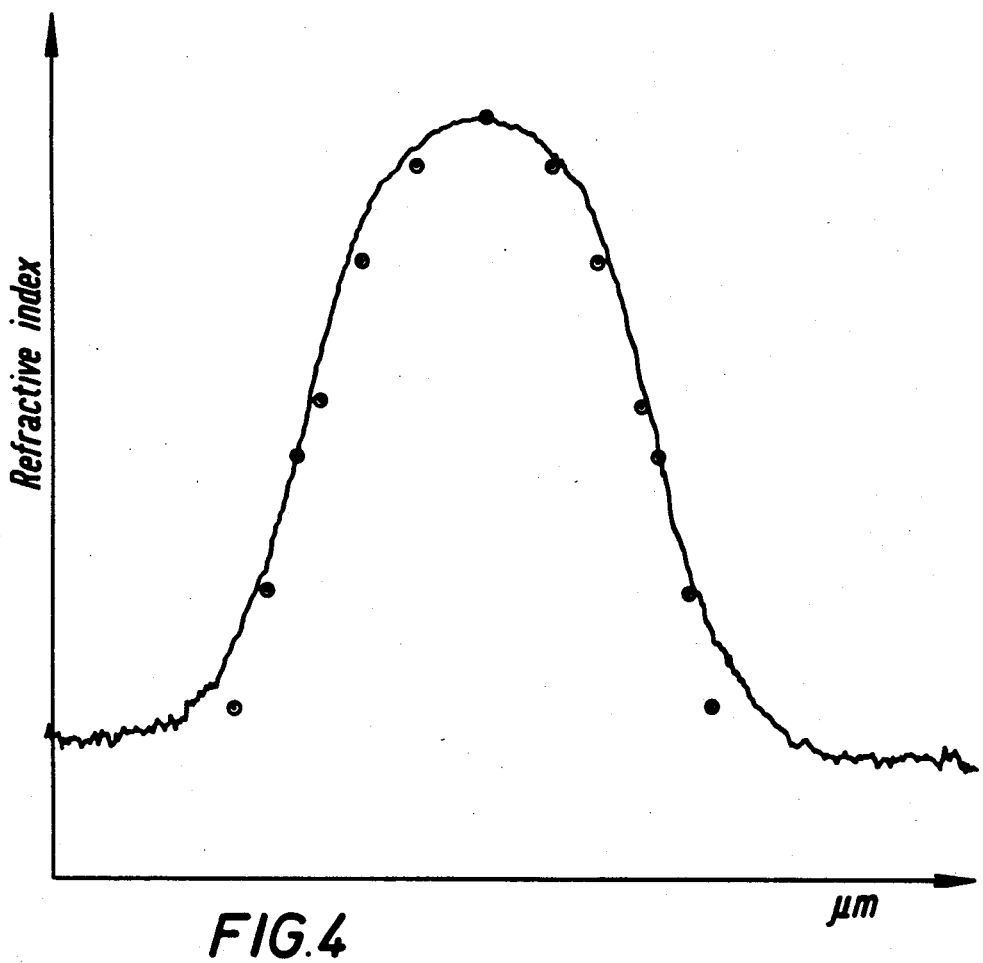
Figure 5:
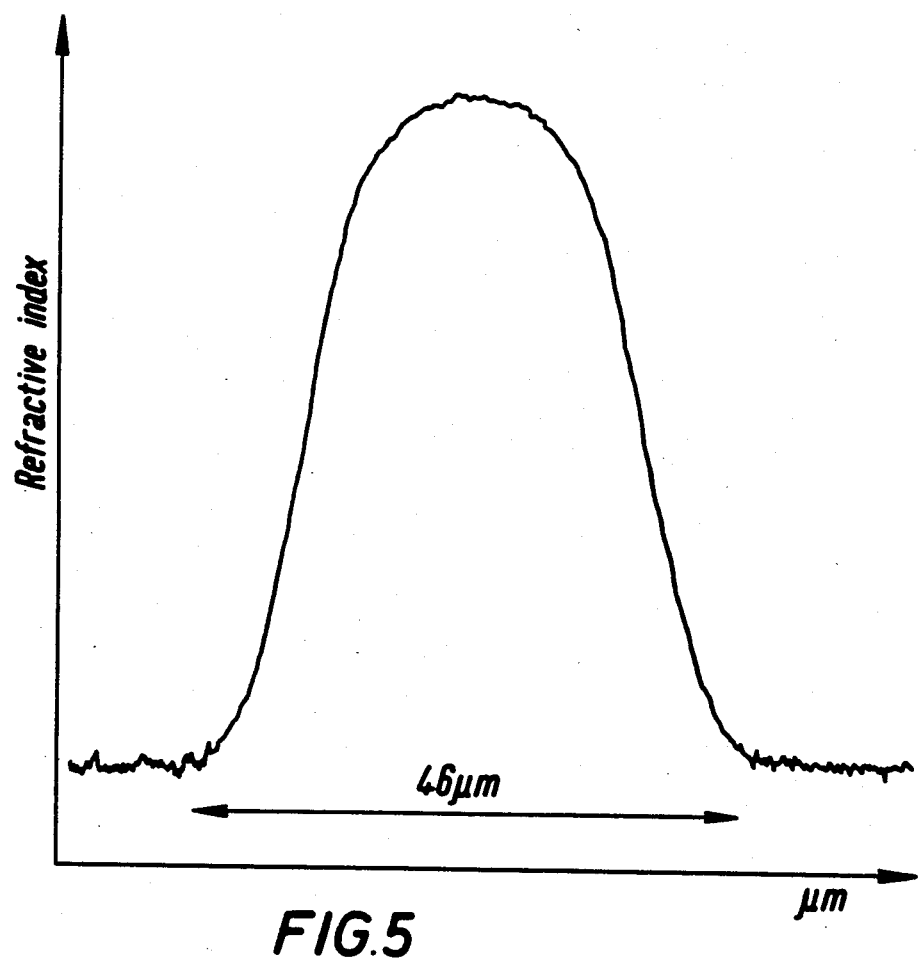
Figure 6:
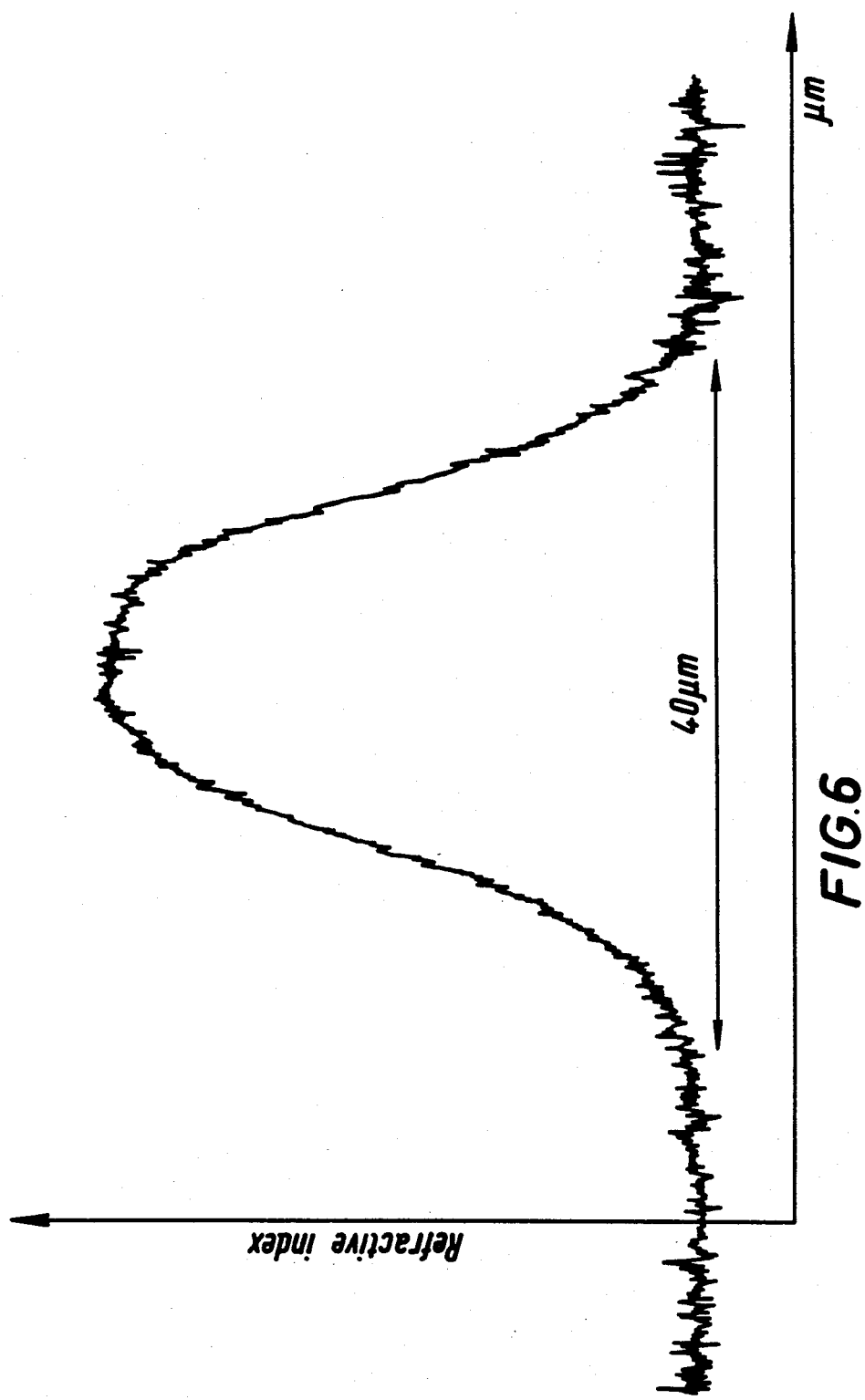
Figure 7:
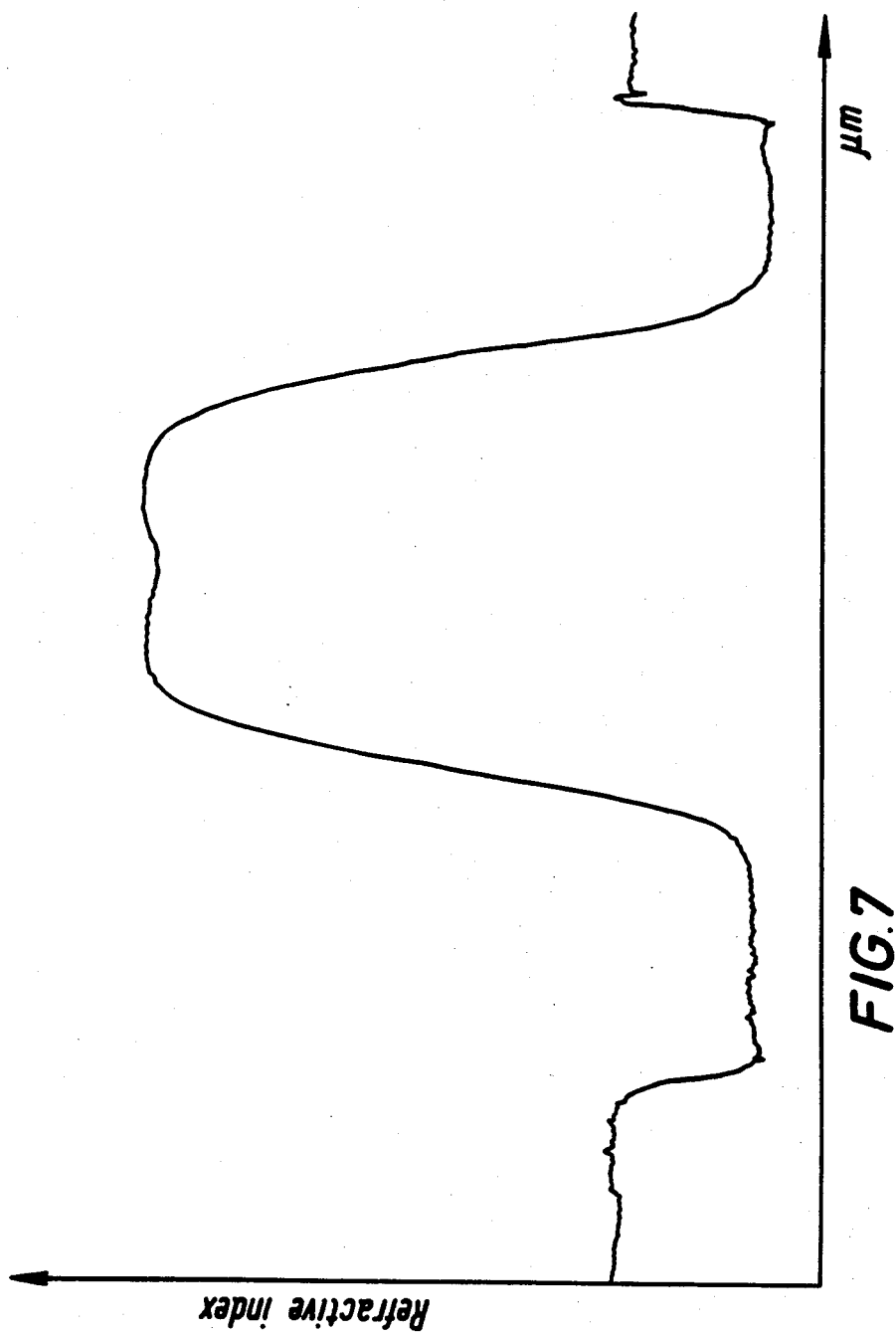
Figure 8:
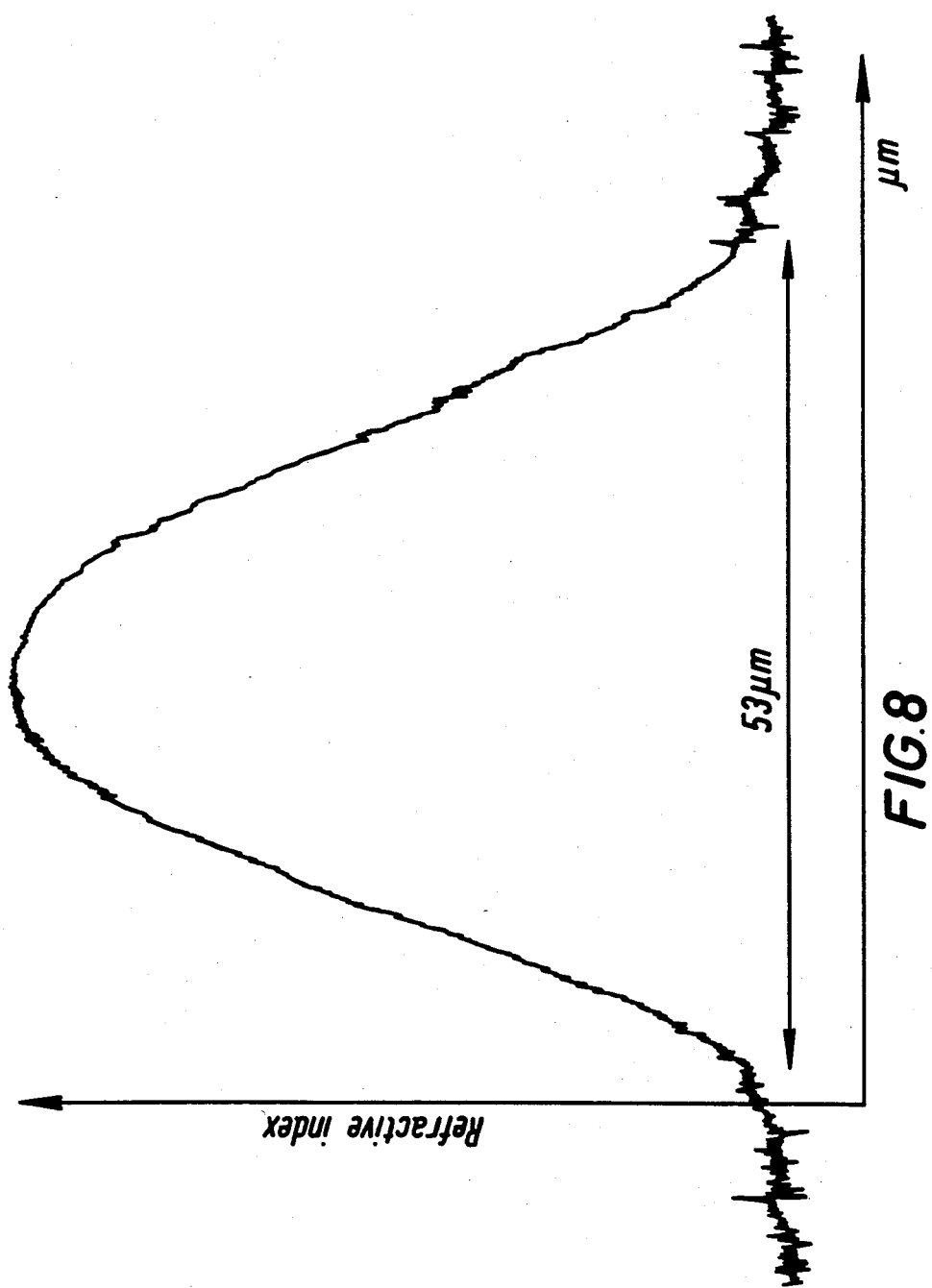
Figure 9:
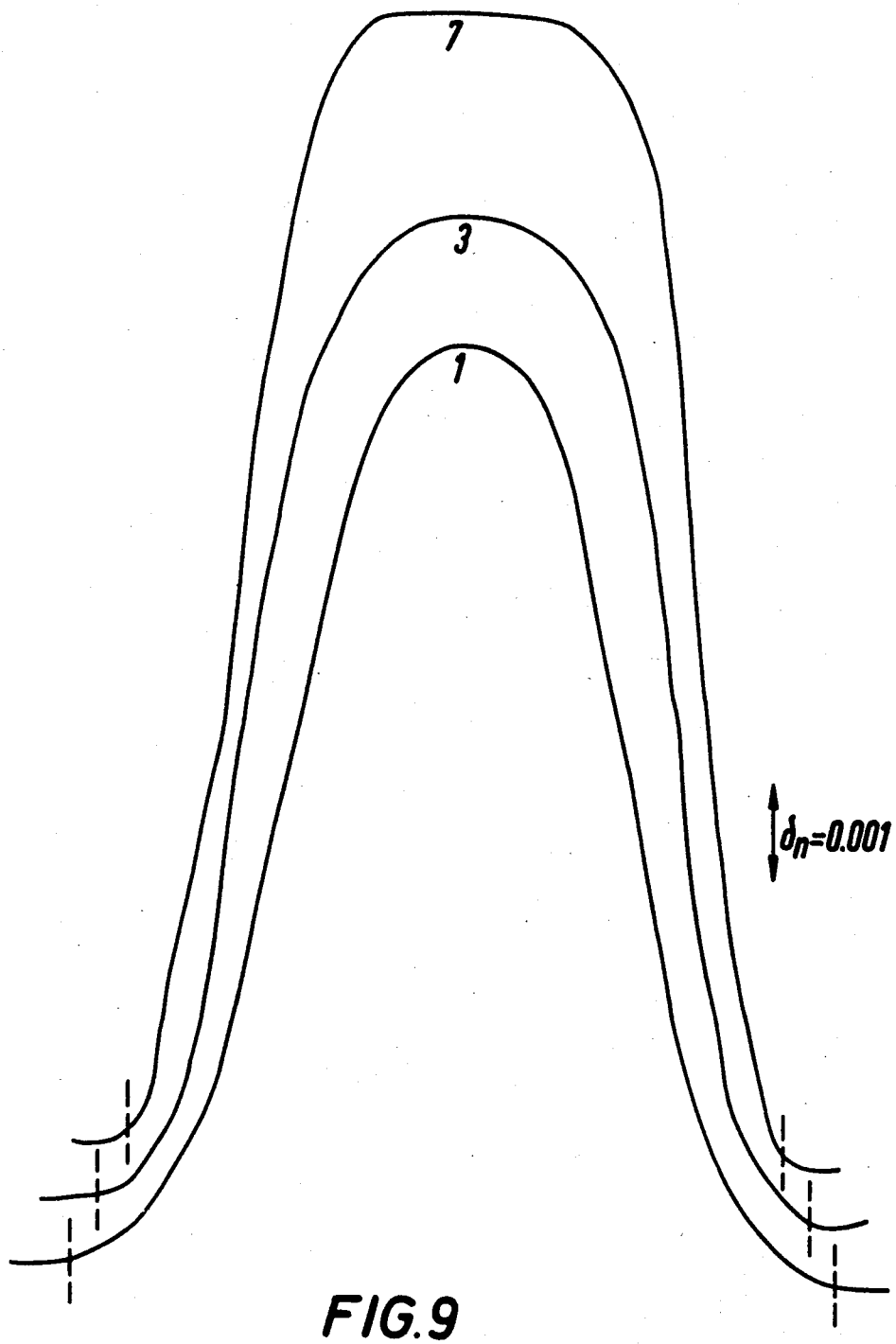
Figure 10:
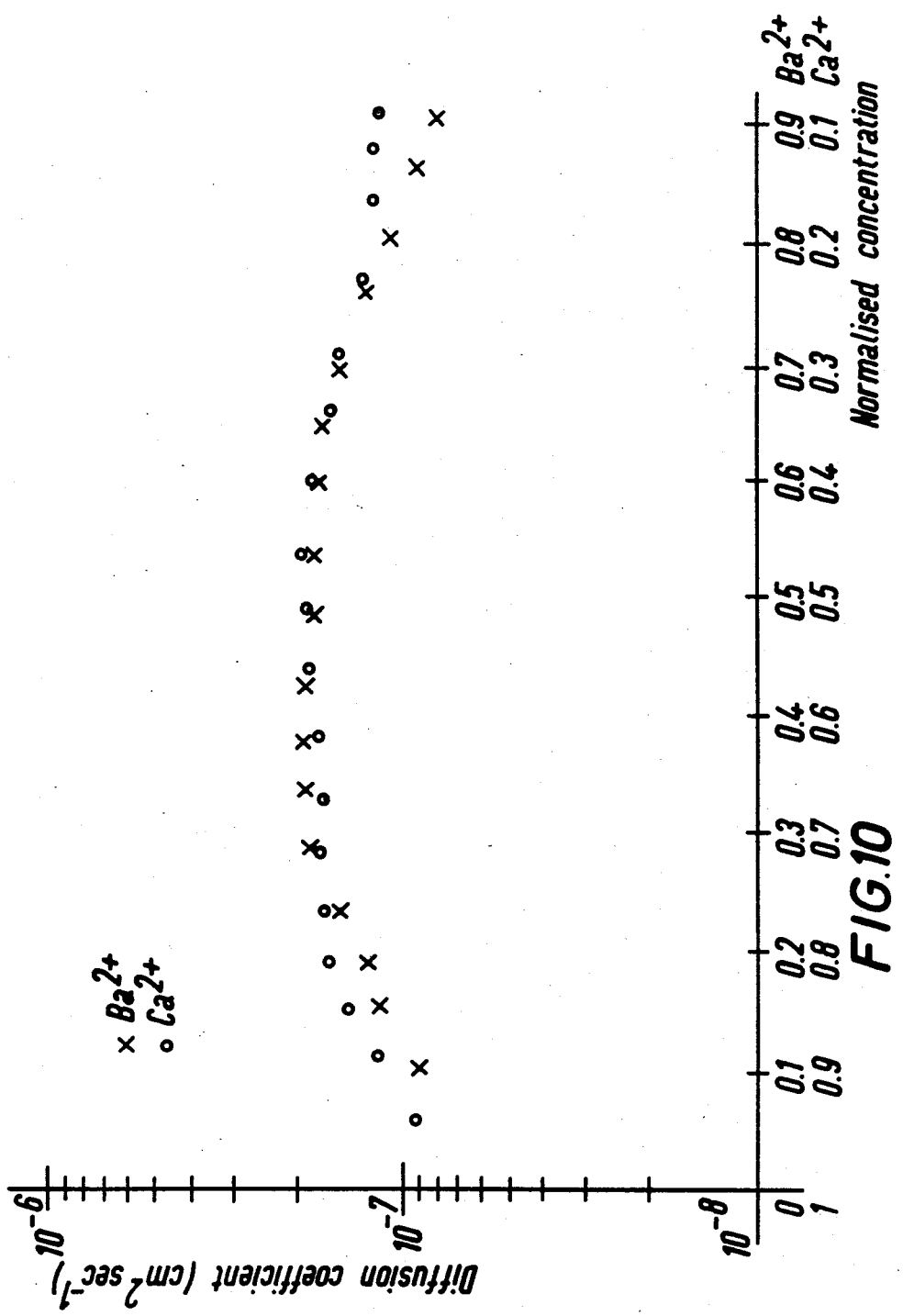
Figure 11:
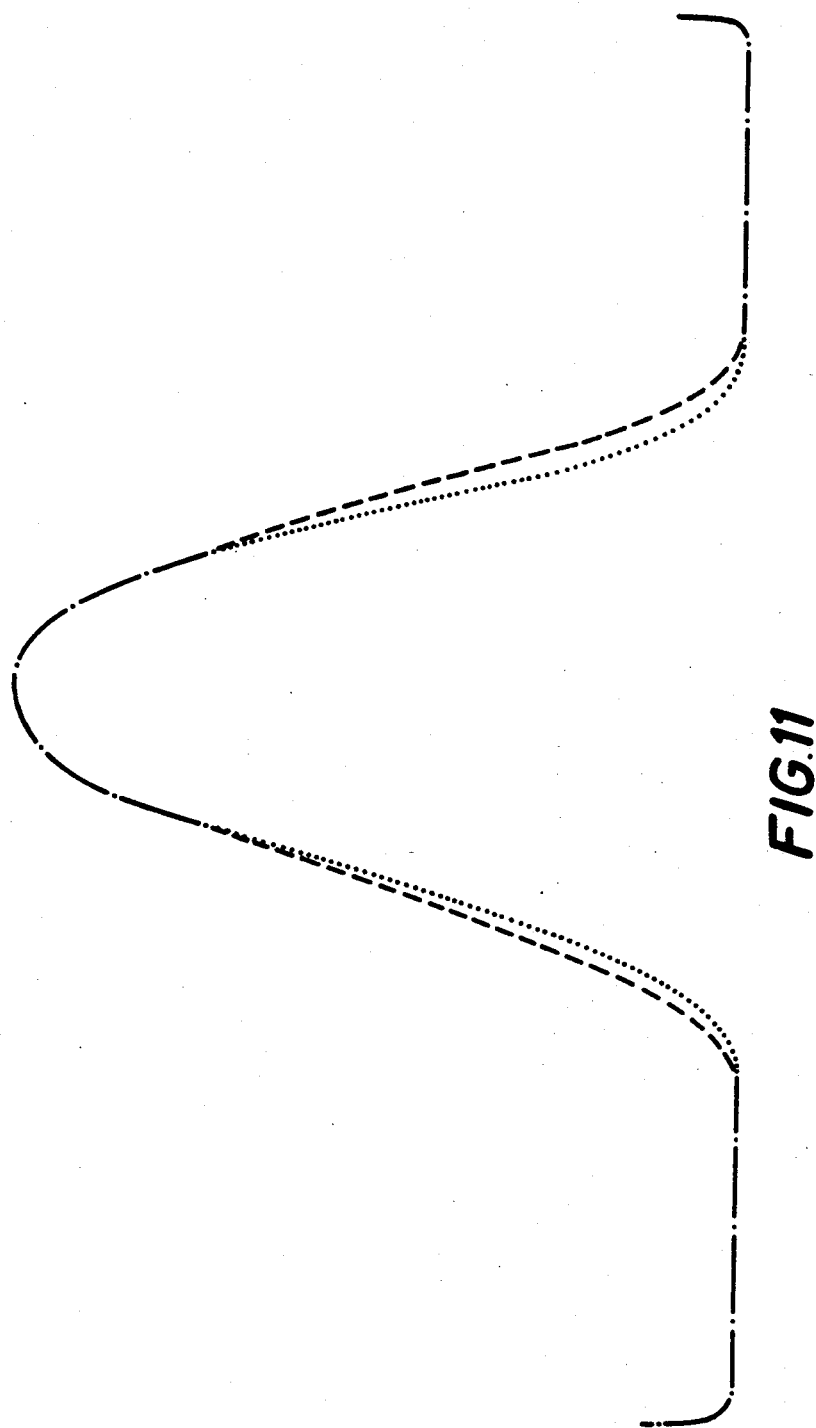
Figure 12:
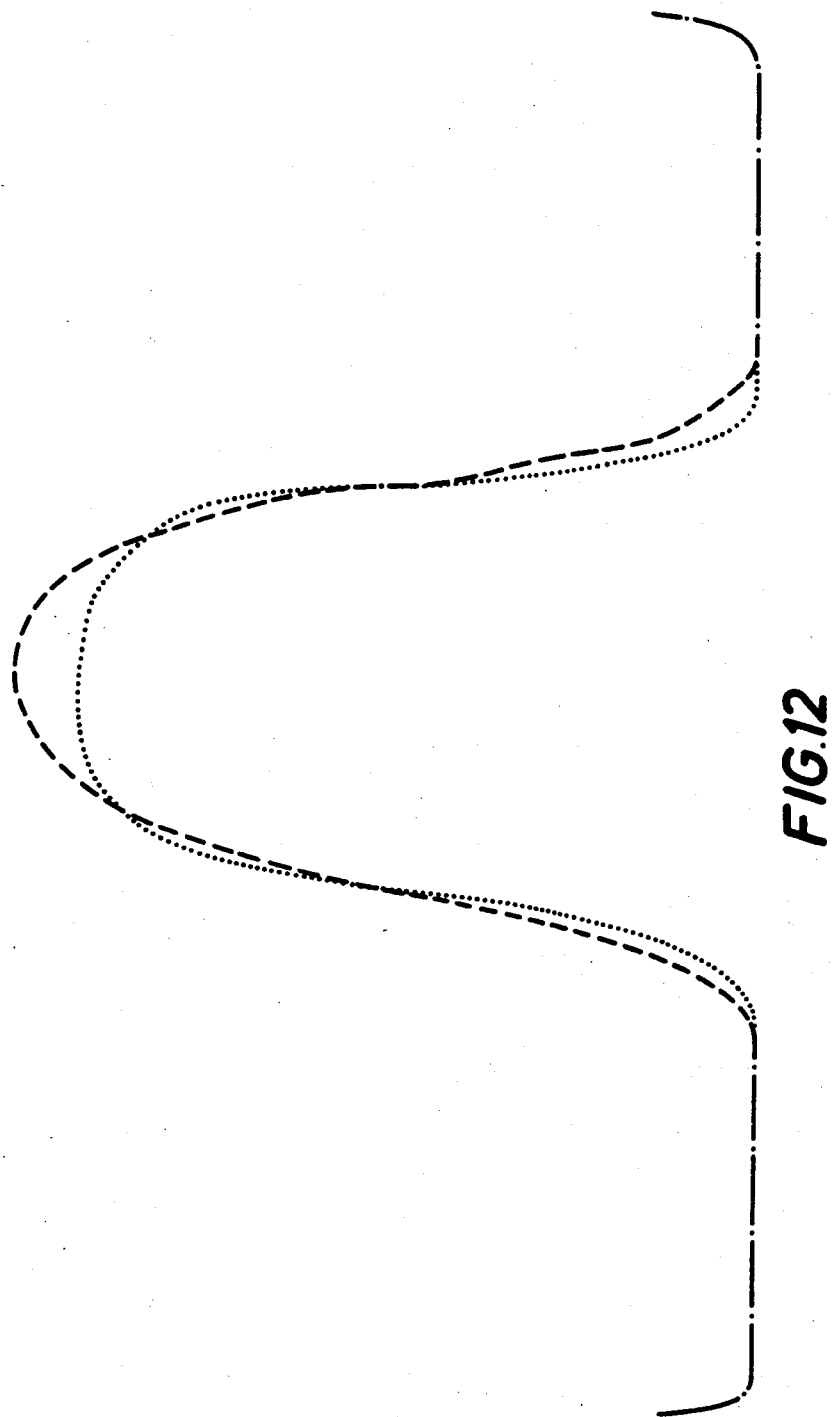

In the Examples reference will be made to the accompanying drawings, in which:

FIG. 1 shows the refractive index profile of the optical fibre of the invention described in Example 5, FIG. 2 shows a plot of total insertion loss against the wavelength for the fibre of Example 5, FIG. 3 shows the pulsewidth response for the fibre of Example 5, FIG. 4 shows the refractive index profile of the fibre of Example 6, FIG. 5 shows the refractive index profile of the fibre of Example 7, FIG. 6 shows the refractive index profile of the fibre of Example 8, FIG. 7 shows the refractive index profile of the fibre of Example 9, FIG. 8 shows the refractive index profile of the fibre of Example 10, FIG. 9 shows the refractive index profiles of the fibres of Examples 1, 3 and 7, FIG. 10 is a plot of the diffusion coefficients of the $Ba^{2+}$ and $Ca^{2+}$ against concentration, FIG. 11 shows the refractive index profiles of the fibres of Examples 12 and 4, and FIG. 12 shows the refractive index profiles of the fibres of Examples 13 and 14.

The refractive index profile of the fibre of Example 5 is shown in FIG. 1.

This is a slightly over-diffused profile, i.e. too much diffusion has occurred to give the optimal parabolic refractive index distribution. The extent of diffusion $\phi$, which ideally should have a value of from 0.06 to 0.08, was calculated from the measured profile to have a value of 0.20. The quantity $\phi$ is given by the equation:

$$\phi = \frac{Dt}{A^2} = \frac{DL}{a^2 v}$$

where

D is the diffusion coefficient (dependent on temperature), t is the residence time of the glass in the nozzle (also temperature-dependent), A is the radius of the core stream in the double crucible, L is the length of the diffusion nozzle of the double crucible, a is the radius of the fibre, and v is the pulling speed of the fibre.

It will be seen that the extent of diffusion can be reduced without much difficulty, by, for example, reducing the length of the nozzle, increasing the pulling speed or decreasing the core size. Increasing the amount of diffusion is much more difficult.

FIG. 2 shows a plot of total loss against wavelength for full numerical aperture launch. From this Figure it can be seen that the total insertion loss of the fibre at 850 to 900 nanometers is 8.2 dB/km. The absorption loss at selected wavelengths is indicated on FIG. 2 by a series of crosses, showing the scatter loss to be approximately 2.5 dB/km which approaches the theoretically predicted loss due to Rayleigh scattering. This means that pulse width measurements on this fibre will give meaningful results. The pulse width of a one-nanosecond pulse after transmission through 1.91 km of fibre is shown in FIG. 3. From this it can be shown that the pulse broadening for the fibre is 2.8 ns/km.

The numerical aperture was calculated from the refractive index profile to be 0.18. As may be seen from Table 2, the use of barium oxide instead of calcium oxide in the core glass gives higher numerical aperture values: the use of a higher proportion of calcium oxide has a similar but less marked effect.

Referring again to Table 2, the theoretical bandwidths given for Examples 1, 3, 7, 8, 9, 14 and 15 were predicted from the measured refractive index profiles using a ray-tracing technique described in the paper "Bandwidths of diffused core fibres" by J. V. Wright, 4th European Conference Optical Communications Geneva (1978), pages 270 to 275.

Considering first the measured bandwidths, the improvement obtained by excluding ion-exchange is not immediately apparent except in Examples 1 and 7. The reason for this lies in the extent of diffusion; the fibre of Example 3 is underdiffused (as is that of Example 7 whereas the fibres of Examples 4, 5 and 11 are over diffused. This is apparent from the approximate values of $\phi$, the extent of diffusion, shown in the Table. For Examples 1, 3 and 7, this can be seen more clearly in FIG. 9 of the accompanying drawings, in which the profiles of these three fibres are superimposed. These fibres were drawn under identical conditions and, as may be seen from Table 2, have the same cladding glass. The $\phi$ value decrease in the order $\phi_1 > \phi_3 \phi_7$, and the profile of Example 7 is very step-natured ($\phi$ approximately 0.01). The profiles of Examples 1 and 3 demonstrate the superiority of barium oxide over calcium oxide despite the larger ionic radius of $Ba^{2+}$.

From the equation for $\phi$ given previously, it will be seen that under constant conditions (constant t, A, L, a, v) the quantity $\phi$ is proportional to the diffusion coefficient D; in a step-index fibre $\phi$ is of course zero. The $\phi$ value of a graded-index fibre can be computed from the measured refractive index profile. According to simple diffusion theory the diffusion coefficient D is independent of concentration and $\phi$ should therefore be constant over the whole profile. This has been found to be the case for fibres in which diffusion involves ion-exchange between ions of like charge-type; for example the $\phi$ value of the glass pair of Example 11 was found to be approximately 0.09 over the whole profile. The independence of D of concentration in this system was also tested independently by measuring the diffusion coefficients of the $Ba^{2+}$ and $Ca^{2+}$ ions. Because of the difficulties in calculation involved in a system such as an optical fibre having a cylindrical interface, the measurements were carried out using blocks of glass and a planar interface; the results are shown in FIG. 10 of the drawings. The diffusion coefficients of the two ions at 1000° C. are shown and it will be seen that both exhibit only a slight variation, within a factor of about 2, and are virtually the same at normalised concentrations of 0.1 and 0.9.

A constant-$\phi$ profile does not, however, give the best optical properties. As is well known, an approximately parabolic distribution with a $\phi$-value varying from a maximum in the centre to approximately zero at the sides gives the maximum bandwidth. The "tailing" of a typical constant-$\phi$ refractive index profile away from the fibre axis leads to degradation of the bandwidth. Reduction of the size of these "tail" areas to give a more nearly parabolic profile should therefore lead to an improvement in bandwidth, the same maximum $\phi$-value.

When an attempt was made to calculate the $\phi$-values for the fibres of Examples 1 to 4 and 12, it was found that there was a substantially greater variation of $\phi$ with distance from the axis than expected; the values given in Table 2 are the maxima measured at the centres of the profiles. Thus the profiles of these fibers approximate more closely to the ideal parabolic distribution than would be predicted by simple diffusion theory.

Consideration of the equation for $\phi$ given previously indicates that, since the other parameters were constant, the diffusion coefficient D was varying with distance from the interface i.e. with the concentration of diffusing species. It is therefore apparent that the improved profiles obtained when ion-exchange is excluded can be attributed to an abnormal diffusion effect.

An improvement in the shape of the profile would be expected to lead to an improved measured bandwidth, and this can be seen in Examples 1 and 2, for which the maximum $\phi$-values are close to the optimum. For some Examples the theoretical bandwidth has also been calculated, using J. V. Wright's method mentioned previously; this calculation assumes all modes launched and hence gives the most pessimistic bandwidth for a given measured profile but it still shows the claimed trend.

As previously mentioned, Examples 12 to 15 show the effect of incorporating alumina in the cladding glass. The refractive index profiles of the fibres of Examples 12 and 4 are compared in FIG. 11 of the drawings, and those of Examples 13 and 14 in FIG. 12.

Referring to FIG. 2, the dotted line represents the profile of the fibre of Example 12 in which the cladding glass contains 2.5 mole percent of alumina, and the dashed line represents the profile of the comparison fibre of Example 4. At the chain-dotted region the two profiles coincide. It will be seen that the effect of introducing alumina into the cladding glass is to decrease the size of the "tail" areas of the profile. This results in an improvement in the measured 3 dB optical bandwidth from 100 to 150 MHz km. It will be noted that the centre of the profile is unchanged; the $\phi$-value at the centre is the same for both profiles but is lower at the sides in Example 12, giving a better approximation to the ideal parabolic shape with $\phi$ approaching zero at the sides. Both profiles are somewhat overdiffused, the $\phi$-value at the centre being about 0.09.

Turning now to FIG. 12, the dotted line relates to Example 13 and the dashed line to the comparison fibre without alumina in the cladding, Example 14. In this case the profile of the comparison fibre is considerably underdiffused ($\phi$ approximately 0.01) and the overall reduction of the diffusion rate caused by the addition of alumina to the cladding results an even greater underdiffusion ($\phi$ less than 0.01) and a corresponding reduction in bandwidth from 7.2–136 MHz km to 35 MHz km. The improvement in bandwidth that would result from the reduction of the "tail" areas is in this case completely cancelled out by the overall reduction in the extent of diffusion.

Example 15 also relates to an underdiffused system, but since it is less underdiffused ($\phi$ between 0.02 and 0.05) than the system of Examples 13 and 14 the addition of alumina to the cladding results in a proportionately smaller reduction in bandwidth.

We claim:

1. A graded index glass optical fibre having a total insertion loss of less than 20 dB/km and having a core and a cladding, said core being formed from a first glass consisting of silica, boric oxide, one alkali metal oxide selected from the group consisting of sodium oxide and potassium oxide, one alkaline earth metal oxide selected from the group consisting of calcium oxide, strontium oxide and barium oxide, and optionally, up to about 5 mole percent of one or more compatible oxides, said compatible oxides not including an alkali metal oxide, and said cladding being formed from a second glass having a refractive index at least 1% lower than that of said first glass and consisting of silica, boric oxide, the same alkali metal oxide as in said first glass, and optionally, up to about 5 mole percent of one or more other compatible oxides, said other compatible oxides not including calcium, strontium oxide or barium oxide or an alkali metal oxide, said first and second glass compositions being selected to exclude compositions which undergo phase separation or devitrification during optical fibre production, and said gradation of refractive index being produced by thermal diffusion between said first and second glasses and being at least partly caused by a composition gradient of alkaline earth metal oxide: said graded index optical fibre being characterised in that the mole percentage of the alkali metal oxide in said first glass is substantially equal to or greater than the mole percentage of the alkali metal oxide in said second glass.

2. An optical fibre as claimed in claim 1, further characterised in that said first glass contains 55–65 mole percent silica, 10–20 mole percent boric oxide, 14–25 mole percent sodium oxide, and 2–11 mole percent of the alkaline earth metal oxide.

3. An optical fibre as claimed in claim 1, further characterised in that said first glass contains 57–61 mole percent silica, 14–16.5 mole percent boric oxide, 19–22 mole percent sodium oxide, and 3–8 mole percent barium oxide.

4. An optical fibre as claimed in claim 1, further characterised in that said second glass contains 55–65 mole percent silica, 10–20 mole percent boric oxide, and 14–25 mole percent sodium oxide.

5. An optical fibre as claimed in claim 2, further characterised in that said second glass contains 55–65 mole percent silica, 10–20 mole percent boric oxide, and 14–25 mole percent sodium oxide.

6. An optical fibre as claimed n claim 3, further characterised in that said second glass contains 55–65 mole percent silica, 10–20 mole percent boric oxide, and 14–25 mole percent sodium oxide.

7. An optical fibre as claimed in claim 1, further characterised in that said second glass contains 59–63 mole percent silica, 17–19 mole percent boric oxide, and 19–22 mole percent of sodium oxide.

8. An optical fibre as claimed in claim 2, further characterised in that said second glass contains 59–63 mole percent silica, 17–19 mole percent boric oxide, and 19–22 mole percent of sodium oxide.

9. An optical fibre as claimed in claim 3, further characterised in that said second glass contains 59–63 mole percent silica, 17–19 mole percent boric oxide, and 19–22 mole percent of sodium oxide.

10. An optical fibre as claimed in claim 1, further characterized in that said core glass is substantially free from alumina, that said second glass contains up to 4 mole percent of alumina, and that when said compatible oxides in said second glass include alumina, the combined total amount thereof in said second glass does not exceed 5 mole percent.

* * * * *